(12) United States Patent
Yoshida

(10) Patent No.: US 8,312,744 B2
(45) Date of Patent: Nov. 20, 2012

(54) BURNER FOR PRODUCING GLASS FINE PARTICLES AND METHOD FOR MANUFACTURING POROUS GLASS BASE MATERIAL USING THE SAME

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 290 days.

(21) Appl. No.: 12/711,216

(22) Filed: Feb. 23, 2010

(65) Prior Publication Data

US 2010/0218554 A1    Sep. 2, 2010

(30) Foreign Application Priority Data

Feb. 27, 2009   (JP) ................................. 2009-046109

(51) Int. Cl.
*C03B 37/018* (2006.01)
(52) U.S. Cl. ........................................................ 65/531
(58) Field of Classification Search .................. 65/531, 65/431
See application file for complete search history.

(56) References Cited

U.S. PATENT DOCUMENTS 3,698,936 A  * 10/1972  Moltzan ........................ 427/452
4,406,684 A  *  9/1983  Kawachi et al. ................ 65/157
4,810,189 A     3/1989  Mikami et al.
5,922,100 A  *  7/1999  Cain et al. ....................... 65/531
6,751,987 B1 *  6/2004  Ball et al. ....................... 65/17.4

(Continued)

FOREIGN PATENT DOCUMENTS

JP          03-009047 B2    2/1991
(Continued)

OTHER PUBLICATIONS

European Search Report dated Apr. 21, 2010, in a counterpart European patent application No. 10001898.5 for Examiner consideration, citing U.S. Patent Application Publication No. 1 and Foreign Patent Document Nos. 1-6 listed above.

*Primary Examiner* — John Hoffmann
(74) *Attorney, Agent, or Firm* — Chen Yoshimura LLP

(57) ABSTRACT

There is provided a burner for producing glass fine particles, including: a glass material gas discharge port; a combustible gas discharge port that is provided so as to surround the glass material gas discharge port, a center of the combustible gas discharge port being positioned on a center of the glass material gas discharge port; and a plurality of small-diameter oxidizing gas discharge ports that are provided within the combustible gas discharge port in one or more concentric circles with respect to the glass material gas discharge port. Here, small-diameter oxidizing gas discharge ports in a same circle have a same focus length, each of the plurality of small-diameter oxidizing gas discharge ports has: a gas introducing portion at which the small-diameter oxidizing gas discharge port branches from a common main tube; and a fastening portion that is positioned between the gas introducing portion and an end of the small-diameter oxidizing gas discharge port that is opposite to the gas introducing portion, and $D_1 > D_3$ and $D_2 > D_3$ when $D_1$ denotes an inner diameter of each of the plurality of small-diameter oxidizing gas discharge ports at the fastening portion, $D_2$ denotes the inner diameter of the small-diameter oxidizing gas discharge port at the gas introducing portion, and $D_3$ denotes the inner diameter of the small-diameter oxidizing gas discharge port at a different portion than the fastening portion and the gas introducing portion.

3 Claims, 8 Drawing Sheets

U.S. PATENT DOCUMENTS

2005/0274150 A1  12/2005  Onodera et al.

FOREIGN PATENT DOCUMENTS

| | | | |
|---|---|---|---|
| JP | 10-095623 | A | 4/1998 |
| JP | 10-101343 | A | 4/1998 |
| JP | 2000-104908 | A | 4/2000 |
| JP | 2002-356332 | A | 12/2002 |
| JP | 2003-165737 | A | 6/2003 |
| JP | 2006-016235 | A | 1/2006 |
| JP | 2008-063179 | A | 3/2008 |

\* cited by examiner

BURNER FOR PRODUCING GLASS FINE PARTICLES AND METHOD FOR MANUFACTURING POROUS GLASS BASE MATERIAL USING THE SAME

CROSS REFERENCE TO RELATED APPLICATION

The present application claims priority from a Japanese Patent Application No. 2009-046109 filed on Feb. 27, 2009, the contents of which are incorporated herein by reference.

BACKGROUND

1. Technical Field

The present invention relates to a burner for producing glass fine particles used for manufacturing optical fiber glass base materials (hereinafter, simply referred to as a "burner") and to a method for manufacturing porous glass base materials using the burner.

2. Description of the Related Art

A variety of methods have been conventionally developed to manufacture optical fiber base materials. One of such conventional methods is the Outside Vapor Deposition (OVD) method that attaches and deposits glass fine particles generated in a flame of a burner onto a starting member having a thickness of approximately 50 mm$\phi$ while the starting member is being rotated and reciprocated relative to the burner, to obtain a soot having a thickness of approximately 250 mm$\phi$ to 350 mm$\phi$, and then dehydrates and sinters the soot in an electric furnace. The OVD method is widely used due to its capability of producing optical fiber base materials having relatively desired refractive index distribution and mass-producing large-diameter optical fiber base materials.

In the conventional art, a concentric multi-tube burner is used to fabricate a deposit of glass fine particles. The concentric multi-tube burner does not sufficiently blend a glass material gas, a combustible gas, and an oxidizing gas. Therefore, no sufficient amount of glass fine particles are produced. As a result, the concentric multi-tube burner cannot achieve a high yield and has difficulties in fabricating deposits of glass fine particles within a short period of time.

To solve this problem, Examined Japanese Patent Publication No. 03-009047 proposes a multi-nozzle burner that is configured such that small-diameter oxidizing gas discharge ports (hereinafter, simply referred to as the "small-diameter gas discharge ports) are disposed within a combustible gas discharge port so as to surround a centrally arranged material gas discharge port.

Generally speaking, the small-diameter gas discharge ports are provided by several to several dozen small-diameter tubes that branch from a main tube connected to the gas inlet of the burner and thus relatively heavy. Therefore, the tubes become flexible due to their own weights in the high-temperature environment, which results in eccentricity at the end of the burner. To address this issue, Japanese Patent Application Publication No. 10-095623 proposes a technique of fastening the small-diameter gas discharge ports to adjacent inner or outer tubes in order to prevent flexure and vibration.

The multi-nozzle burner disclosed in Japanese Patent Application Publication No. 10-095623, however, includes a large number of small-diameter tubes, which are thus fastened in a very complicated fashion.

Because of the complicated fastening, such multi-nozzle burners are fabricated manually one by one. Therefore, large individual differences are observed among such burners. Specifically speaking, some burners suffer from a higher likelihood of attachment of glass fine particles onto the ends of the small-diameter gas discharge ports than others, and the deposition efficiency varies among the burners.

SUMMARY

Therefore, it is an object of an aspect of the innovations herein to provide a multi-nozzle burner for producing glass fine particles with a high efficiency that has a small individual difference despite its complicated structure, and a method for manufacturing a porous glass base material using the burner, which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary burner for producing glass fine particles may include: a glass material gas discharge port; a combustible gas discharge port that is provided so as to surround the glass material gas discharge port, a center of the combustible gas discharge port being positioned on a center of the glass material gas discharge port; and a plurality of small-diameter oxidizing gas discharge ports that are provided within the combustible gas discharge port in one or more concentric circles with respect to the glass material gas discharge port. Here, small-diameter oxidizing gas discharge ports in a same circle have a same focus length, each of the plurality of small-diameter oxidizing gas discharge ports has: a gas introducing portion at which the small-diameter oxidizing gas discharge port branches from a common main tube; and a fastening portion that is positioned between the gas introducing portion and an end of the small-diameter oxidizing gas discharge port that is opposite to the gas introducing portion, and $D_1 > D_3$ and $D_2 > D_3$ when $D_1$ denotes an inner diameter of each of the plurality of small-diameter oxidizing gas discharge ports at the fastening portion, $D_2$ denotes the inner diameter of the small-diameter oxidizing gas discharge port at the gas introducing portion, and $D_3$ denotes the inner diameter of the small-diameter oxidizing gas discharge port at a different portion than the fastening portion and the gas introducing portion.

According to the second aspect related to the innovations herein, one exemplary method for manufacturing a porous glass base material uses the above-described burner.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

It has been found as a result of thorough examination that the individual differences among multi-nozzle burners, which each have a plurality of small-diameter gas discharge ports, result from the variance in gas flow rate among the small-diameter gas discharge ports of each multi-nozzle burner.

For example, when a certain small-diameter gas discharge port has an extremely low gas flow rate, the gas flow speed of this port is consequently low and glass fine particles are more likely to attach to the end of this port. Furthermore, when the gas flow rate varies among the discharge ports in a single burner, the degree of the reaction accordingly varies between the discharge ports with a relatively low gas flow rate and the other discharge ports. In this case, this burner exhibits a lower deposition efficiency in comparison with a burner in which the small-diameter gas discharge ports have equal gas flow rates and the reactions occur in a balanced manner.

Figure 4:
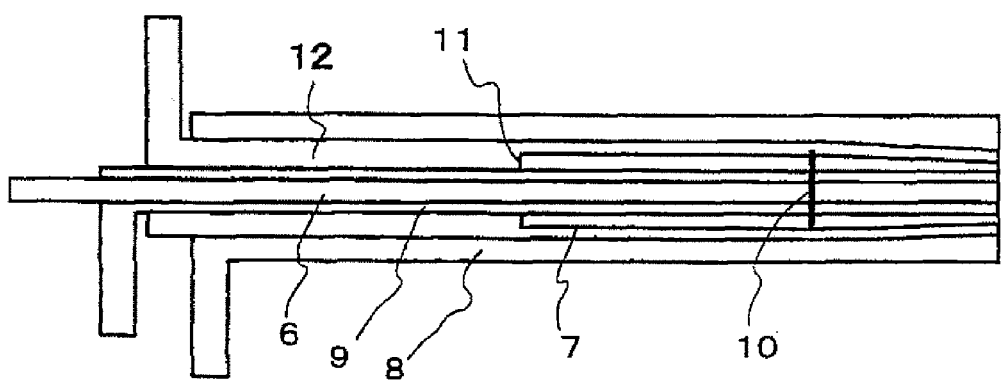
FIG. 4 is a schematic view illustrating the vertical section of the burner of FIG. 2.
Figure 5A:
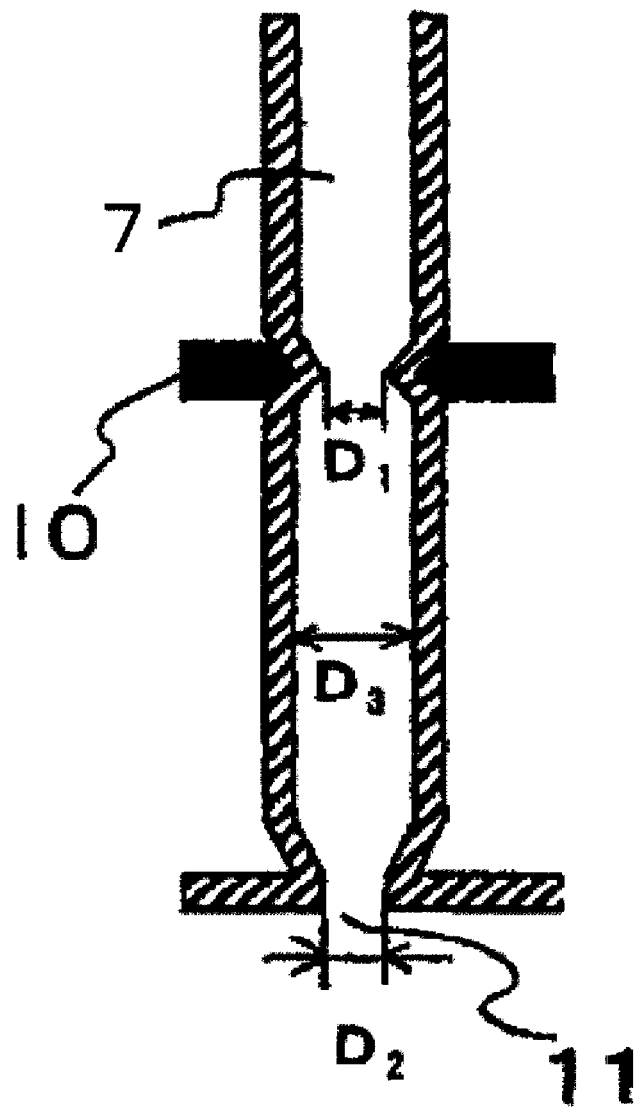
FIG. 5A is a schematic view illustrating how the small-diameter gas discharge ports are fastened to each other.

It has been determined that the above-described variance in the gas flow rate among the small-diameter gas discharge ports is attributed not to the variance among the straight portions of the small-diameter tubes, which are formed with high accuracy, but to the following problem. When the branch portion of each small-diameter tube at which the small-diameter tube branches from the main tube as shown in FIG. 4 and the fastening portion of each small-diameter tube are heated to be processed, the diameter of the small-diameter tube is reduced at the branch and fastening portions as shown in FIG. 5A. The above-described variance in the gas flow rate among the small-diameter gas discharge ports is caused by the variance in the degree of the reduction in diameter among the small-diameter tubes. Therefore, to solve the above-mentioned problem, the present invention fastens a plurality of small-diameter gas discharge ports to each other to prevent the reduction in the diameter when the discharge ports are heated to be processed.

Specifically speaking, a plurality of small-diameter gas discharge ports that are arranged in a single circle are fastened to each other in a ring-shaped manner, where the fastening portions are positioned between the branch portions and the ends of the small-diameter gas discharge ports. For example, a plurality of small-diameter gas discharge portions arranged in a single circle are fastened to each other in a ring-shaped manner in such a manner that each small-diameter gas discharge port is fastened to its adjacent small-diameter gas discharge ports at a single location between the branch portion and the end of the small-diameter gas discharge port. Also, the small-diameter gas discharge ports are fastened so that both of the relations $D_3 < D_1$ and $D_3 < D_2$ are satisfied, where $D_1$ denotes the inner diameter of each small-diameter gas discharge port at the fastening portion, $D_2$ denotes the inner diameter of the small-diameter gas discharge port at the branch portion, and $D_3$ denotes the inner diameter of the small-diameter gas discharge port at a portion other than the fastening portion and the branch portion. In other words, the inner diameter of each small-diameter gas discharge port is made larger at the fastening portion and the branch portion than at the straight portion, which is formed with high accuracy.

Figure 5B:
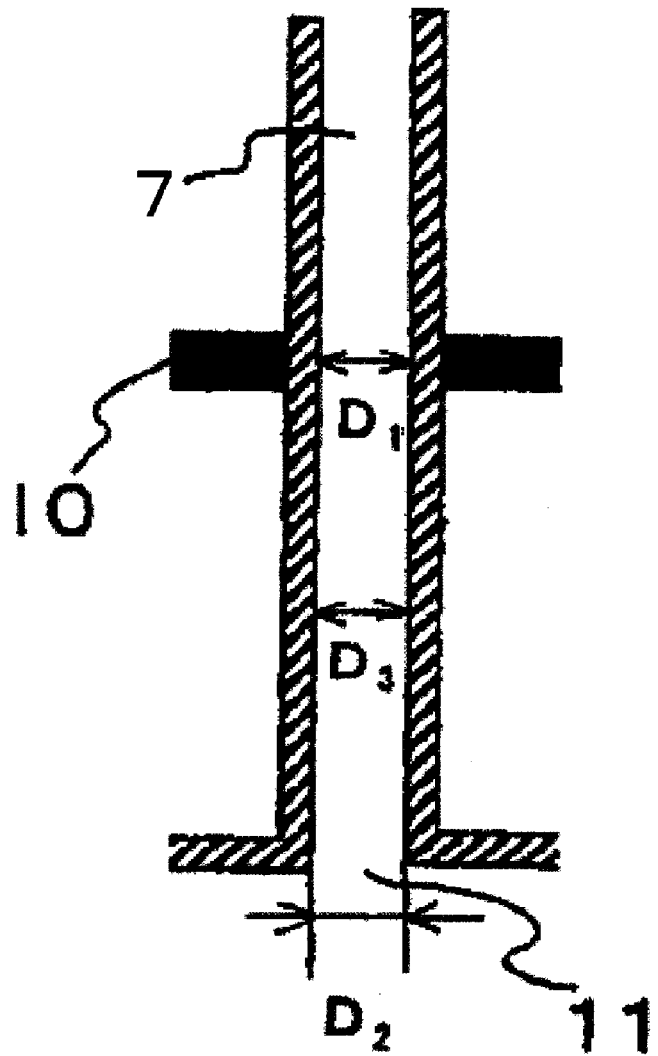
FIG. 5B is a schematic view illustrating how the small-diameter gas discharge ports are fastened to each other.
Figure 5C:
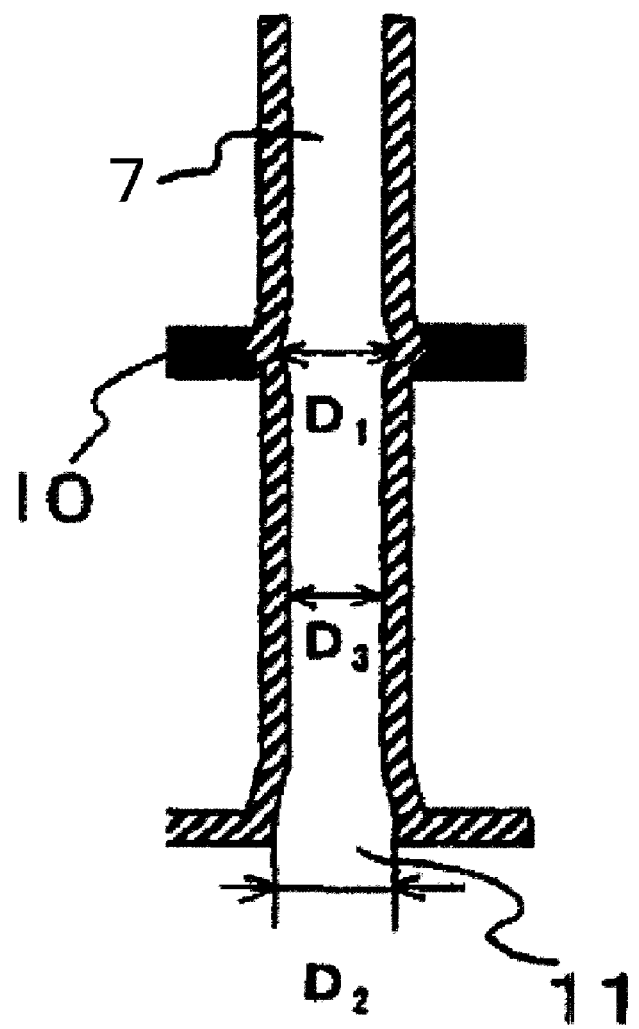
FIG. 5C is a schematic view illustrating how the small-diameter gas discharge ports are fastened to each other.

The relations of $D_3 = D_1$ and $D_3 = D_2$ as shown in FIG. 5B may be ideally satisfied but impossible to be realized when taking into consideration that the glass is processed manually by means of a flame of a burner. Therefore, the diameter of the small-diameter gas discharge port is increased at the branch and fastening portions as shown in FIG. 5C so that $D_3 < D_1$ and $D_3 < D_2$ are achieved. Note that, however, an excessive increase in diameter results in a small tube thickness and thus in insufficient strength. It is thus desirable that the diameter increase ratio falls in the range of $1.0 <= D_1/D_3$ and $1.0 <= D_2/D_3$ and is made as small as possible. In this manner, pressure loss is prevented from becoming more significant at the branch and fastening portions due to the reduction in diameter than at the straight portion. Consequently, the pressure loss of each port can be reduced to substantially the same level, reducing the gas flow rate distribution.

Figure 1:
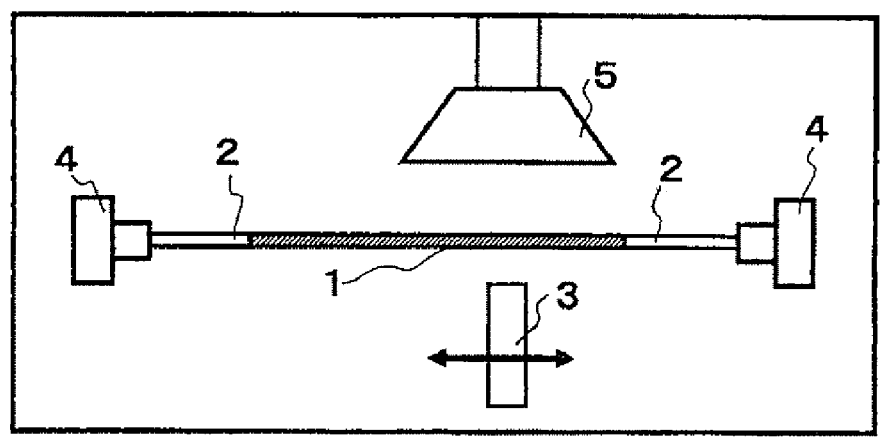
FIG. 1 is a schematic view illustrating an exemplary apparatus for manufacturing a porous glass base material.

FIG. 1 is a schematic view illustrating an exemplary apparatus for manufacturing a porous glass base material. A starting member is formed by a core rod 1 having dummy rods 2 being welded to its respective ends, and is supported by an ingot chuck mechanism 4 so as to axially rotate. A burner 3 sprays a fiber material such as $SiCl_4$ and a combustion gas (a hydrogen gas and an oxygen gas), and is reciprocated along the starting member by a burner guide mechanism (not shown). Hydrolysis in an oxyhydrogen flame produces glass fine particles (soot), which are deposited onto the starting member, to fabricate an optical fiber porous glass base material. Some of the glass fine particles are not attached onto the starting member and released to the outside through an exhaust hood 5.

The fabricated porous glass base material is dehydrated and vitrified through a heating furnace, to be converted into an optical fiber base material.

Figure 2:
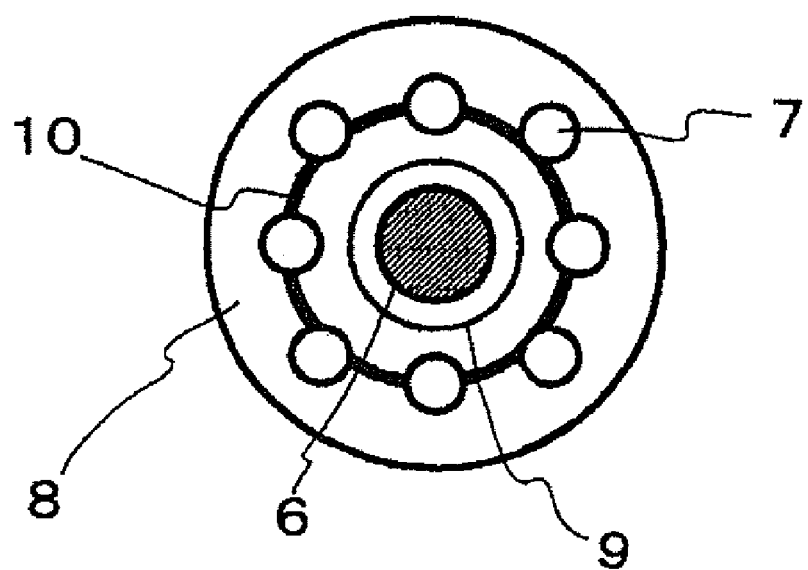
FIG. 2 is a schematic view illustrating the horizontal section of the end portion of a burner relating to the present invention, specifically showing how small-diameter gas discharge ports are arranged so as to form a single concentric circle and fastened to each other in a ring-shaped manner.

FIG. 2 is a schematic view illustrating the horizontal section of a burner relating to the present invention. In a combustible gas discharge port 8, eight small-diameter gas discharge ports 7 are arranged in a single concentric circle so as to surround a glass material gas discharge port 6, with a seal gas discharge port 9 being provided between the small-diameter gas discharge ports 7 and the glass material gas discharge port 6. The small-diameter gas discharge ports 7 in a single concentric circle are fastened in a ring-shaped manner in such a manner that each discharge port 7 is fastened by a material, of which the discharge ports 7 are made, only to adjacent discharge ports 7.

The adjacent discharge ports are preferably fastened to each other by using quartz glass, of which the discharge ports are made.

Figure 3:
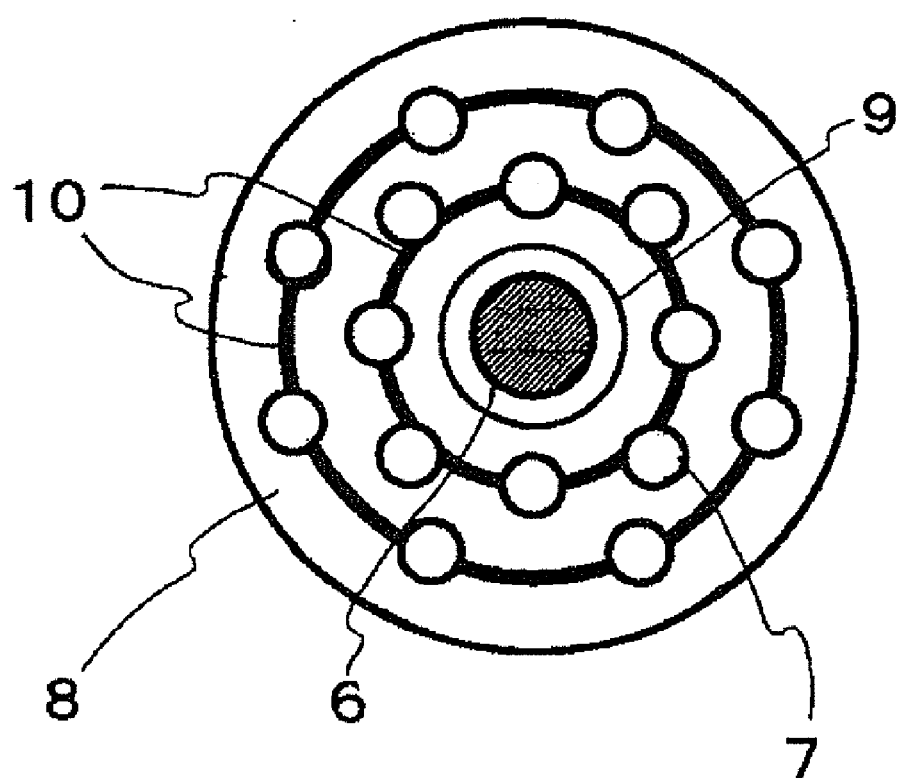
FIG. 3 is a schematic view illustrating the horizontal section of the end portion of a burner relating to the present invention, specifically showing how small-diameter gas discharge ports are arranged so as to form two concentric circles and fastened to each other in a ring-shaped manner.

FIG. 3 similarly shows that the small-diameter gas discharge ports are arranged in two concentric circles within the combustible gas discharge port 8 and that the discharge ports in each circle are fastened to each other in a ring-shaped manner in such a manner that each discharge port is fastened to adjacent discharge ports at a single location between the branch portion and the end of the discharge port.

FIG. 4 is a schematic view illustrating the vertical section of the burner of FIG. 2 along its longitudinal central axis. As shown in FIG. 2, the small-diameter gas discharge ports 7 are arranged in a single concentric circle around the glass material gas discharge port 6 within the combustible gas discharge port 8. The small-diameter gas discharge ports 7 are formed as a plurality of small-diameter tubes branching from a main tube 12 at branch portions 11. The discharge ports 7 in a single circle are fastened in a ring-shaped manner in such a manner that each discharge port 7 is fastened at the fastening portion 10 to adjacent discharge ports 7 in the same circle at a single location between the branch portion 11 and the end of the discharge port 7.

The small-diameter gas discharge ports 7 are slightly expanded at the branch portions 11 and the fastening portions 10 as shown in FIG. 5C. The inner diameter of each discharge port 7 is larger at the fastening portion 10 ($D_1$) and the branch portion ($D_2$) than at a different portion ($D_3$), so that the relations $D_3<D_1$ and $D_3<D_2$ are satisfied. The following describes the present invention with reference to exemplary embodiments and comparison examples.

<First Embodiment>

The apparatus illustrated in FIG. 1 was used to manufacture a porous glass base material based on the OVD method. The burner used has the structure shown in FIG. 2. Specifically speaking, the eight small-diameter gas discharge ports 7 discharging an oxidizing gas are arranged within the combustible gas discharge port 8 in a single concentric circle around the glass material gas discharge port 6 that is located at the center, with the seal gas discharge port 9 being positioned between the glass material gas discharge port 6 and the small-diameter gas discharge ports 7. Here, each small-diameter gas discharge port 7 has a focus length of 150 mm, has an inner diameter of 1.5 mm, and has a length of 200 mm from the branch portion to the end. The eight small-diameter gas discharge ports 7 are fastened to each other in a ring-shaped manner at the location 75 mm away from the end. The inner diameter of each discharge port 7 is increased to 1.6 mm at the branch and fastening portions.

Here, an oxidizing gas was introduced into the eight small-diameter gas discharge ports (A to H), and the gas flow speed at the end of each discharge port was measured by using a hot-wire anemometer. The obtained results indicated that the gas flow speed at the end of each discharge port was equal as shown in Table 1.

TABLE 1

|  | SMALL-DIAMETER DISCHARGE PORT | | | | | | | |
|---|---|---|---|---|---|---|---|---|
|  | A | B | C | D | E | F | G | H |
| BRANCH PORTION INNER DIAMETER [mm] | 1.6 | 1.6 | 1.6 | 1.6 | 1.6 | 1.6 | 1.6 | 1.6 |
| FASTENING PORTION INNER DIAMETER [mm] | 1.6 | 1.6 | 1.6 | 1.6 | 1.6 | 1.6 | 1.6 | 1.6 |
| FLOW SPEED AT END [m/s] | 30 | 30 | 30 | 30 | 30 | 30 | 30 | 30 |

Subsequently, $SiCl_4$ and $O_2$ were supplied to a first tube of this burner, a seal gas was supplied to a second tube, $H_2$ was supplied to a third tube, and $O_2$ was supplied to the small-diameter gas discharge ports provided within the third tube, to deposit glass fine particles of 100 kg onto a starting member that is formed by a core rod with an outer diameter of 50 mm having dummy rods with an outer diameter of 50 mm welded to the respective ends of the core rod. In this case, no glass fine particles attached to the ends of the small-diameter gas discharge ports and the deposition efficiency was 64.2%.

First Comparative Example

Figure 6:
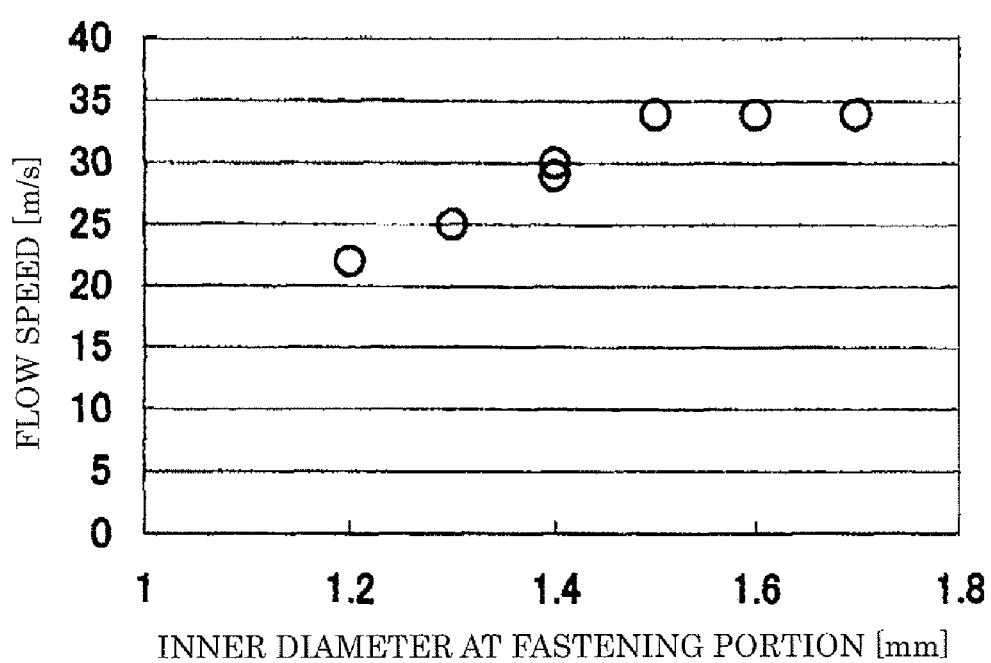
FIG. 6 is a graph illustrating the relation between the flow speed at the end of the small-diameter gas discharge port and the inner diameter of the small-diameter gas discharge port at a fastening portion.

A burner was manufactured in which the diameters of the small-diameter gas discharge ports at the fastening portions were purposefully varied from each other as shown in Table 2. Under the same conditions as in the first embodiment, the flow speed of the oxidizing gas at the end of each small-diameter gas discharge port was measured by using a hot-wire anemometer. The results are shown in Table 2 and also shown by the graph in FIG. 6. Table 2 and FIG. 6 tells that the flow speed at the end of the small-diameter gas discharge port decreases as the inner diameter of the fastening portion of the small-diameter gas discharge port decreases.

TABLE 2

| | SMALL-DIAMETER DISCHARGE PORT | | | | | | | |
|---|---|---|---|---|---|---|---|---|
| | A | B | C | D | E | F | G | H |
| BRANCH PORTION INNER DIAMETER [mm] | 1.6 | 1.6 | 1.6 | 1.6 | 1.6 | 1.6 | 1.6 | 1.6 |
| FASTENING PORTION INNER DIAMETER [mm] | 1.2 | 1.3 | 1.4 | 1.4 | 1.5 | 1.6 | 1.7 | 1.7 |
| FLOW SPEED AT END [m/s] | 22 | 25 | 29 | 30 | 34 | 34 | 34 | 34 |

Under the same conditions as in the first embodiment, except for the use of the differently-structured burner, glass fine particles of 100 kg were deposited onto a starting member that is formed by a core rod with an outer diameter of 50 mm having dummy rods with an outer diameter of 50 mm welded to the respective ends of the core rod. In this case, some glass fine particles attached onto the end of the discharge port A having a reduced inner diameter at the fastening portion, the deposition efficiency was 63.0%, which was lower than 64.2% of the first embodiment.

Second Comparative Example

A burner was manufactured in which the diameters of the small-diameter gas discharge ports at the branch portions were purposefully varied from each other. Under the same conditions as in the first embodiment, the flow speed of the oxidizing gas at the end of each small-diameter gas discharge port was measured. The results are shown in Table 3. As is seen from the results of the first comparative example, the flow speed at the end of the small-diameter gas discharge port decreased as the inner diameter of the small-diameter gas discharge port at the branch portion decreased.

TABLE 3

| | SMALL-DIAMETER DISCHARGE PORT | | | | | | | |
|---|---|---|---|---|---|---|---|---|
| | A | B | C | D | E | F | G | H |
| BRANCH PORTION INNER DIAMETER [mm] | 1.2 | 1.3 | 1.4 | 1.4 | 1.5 | 1.6 | 1.7 | 1.7 |
| FASTENING PORTION INNER DIAMETER [mm] | 1.6 | 1.6 | 1.6 | 1.6 | 1.6 | 1.6 | 1.6 | 1.6 |
| FLOW SPEED AT END [m/s] | 22 | 25 | 29 | 30 | 34 | 34 | 34 | 34 |

Under the same conditions as in the first embodiment, except for the use of the differently-structured burner, glass fine particles of 100 kg were deposited onto a starting member that is formed by a core rod with an outer diameter of 50 mm having dummy rods with an outer diameter of 50 mm welded to the respective ends of the core rod. In this case, some glass fine particles attached onto the end of the small-diameter gas discharge port A having a reduced inner diameter at the branch portion, the deposition efficiency was 62.7%, which was lower than 64.2% of the first embodiment.

As is apparent from the above, the present invention can provide burners (i) whose capabilities have small individual difference from each other, (ii) that can sufficiently blend together the glass material gas, combustible gas, and oxidizing gas, and (iii) that produce glass fine particles at a high yield. Thus, the present invention can enhance the glass fine particle deposition efficiency and improve the productivity of porous glass base material manufacturing apparatuses.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:
1. A burner for producing glass fine particles, comprising:
a glass material gas discharge tube;
a combustible gas discharge tube that is provided so as to surround the glass material gas discharge tube, a center of the combustible gas discharge tube being positioned on a center of the glass material gas discharge tube; and
a plurality of oxidizing gas discharge tubes that are provided within the combustible gas discharge tube such that ports of the oxidizing gas discharge tubes are provided in one or more concentric circles with respect to a port of the glass material gas discharge tube, wherein
the ports of the oxidizing gas discharge tubes in a same circle have a same focus length, each of the plurality of oxidizing gas discharge tubes has:
 a gas introducing portion at which the oxidizing gas discharge tube branches from a common main tube; and
 a fastening portion that is positioned between the gas introducing portion and an end of the oxidizing gas discharge tube that is opposite to the gas introducing portion, and
$D_1 > D_3$ and $D_2 > D_3$ where $D_1$ denotes an inner diameter of each of the plurality of oxidizing gas discharge tubes at the fastening portion, $D_2$ denotes an inner diameter of each of the plurality of oxidizing gas discharge tubes at the gas introducing portion, and $D_3$ denotes a maximum inner diameter of each of the plurality of oxidizing gas discharge tubes at portions other than the fastening portion and the gas introducing portion.

2. The burner as set forth in claim 1, wherein
each of the oxidizing gas discharge tubes whose ports are in the same circle is fastened to an adjacent oxidizing gas discharge tube at a single location between the end and the gas introducing portion.

3. The burner as set forth in claim 2, wherein
the fastening portions are made of the same material as the oxidizing gas discharge tubes.

* * * * *